3,551,379
PROCESS FOR THE MANUFACTURE OF NON-GLOWING POLYVINYL CHLORIDE
Franz-Josef Dany, Hurth, Joachim Kandler, Lechenich, and Peter Münch, Bruhl-Pingsdorf, Germany, assignors to Knapsack Aktiengesellschaft, Knapsack, near Cologne, Germany, a corporation of Germany
No Drawing. Filed Mar. 7, 1968, Ser. No. 711,177
Claims priority, application Germany, Mar 23, 1967, K 61,814
Int. Cl. C08f 45/08
U.S. Cl. 260—41      5 Claims

ABSTRACT OF THE DISCLOSURE

Non-glowing polyvinyl chloride, which may contain carbon black in a proportion of up to about 50 parts by weight per 100 parts by weight polyvinyl chloride, is produced by incorporation of red phosphorus in a proportion of about 0.3 to 10 parts by weight per 100 parts by weight polyvinyl chloride.

---

The numerous possibilities of using polyvinyl chloride include applications which call for the use of polyvinyl chloride that has been freed from its characteristic property of acquiring a static charge, by incorporation of suitable additives. This requirement must be met, for example, when the polyvinyl chloride is intended for use as a floor covering material, for use in connection with surgical instruments or for various applications in mining. Especially this latter application requires the use of antistatically finished polyvinyl chloride. The reason is that electrostatic charges and discharges accompanied by sparks may initiate fire-damp explosions or set off electrical ignition means, such as those used for blasting. This is why substances reducing the electrical resistance to a value of less than $10^4$ ohm-cm. are often added to polyvinyl chloride. Carbon black, more particularly acetylene black, is a suitable additive, which may appear in antistatic polyvinyl chloride in a proportion of up to about 50 parts by weight, preferably in a proportion of about 20 parts by weight, per 100 parts by weight polyvinyl chloride.

Polyvinyl chloride having carbon black incorporated therein is no longer able electrostatically to charge itself. On the other hand, given access to air, it has a disadvantageous after-glow tendency which persists even after extinction of a fire. Polyvinyl chloride free from carbon black has also been found to have an after-glow effect although it is less pronounced than that of polyvinyl chloride containing carbon black. This is a very disadvantageous property of the polyvinyl chloride and handicaps its use in exposed places, which are liable to fire outbreaks, and where preference is given to difficulty inflammable material or at least to material free from after-glow effects.

It has already been proposed that the inflammability of a substance should be reduced by treatment with flameretarding agents, for example compounds of antimony or boron or halogenated derivatives of phosphorous acid or phosphoric acid. Halogenated organic compounds are generally found to be less readily inflammable than halogen-free compounds, the flame resistance increasing with an increasing halogen content. The after-flow tendency of a partially burnt substance does not depend on its self-extinguishing property. Polyvinyl chloride containing carbon black, i.e. an organic halogen compound with some slight ability of self-extinction, has more especially been found in partially burnt form to have an after-flow tendency, and no more than the access of oxygen or air is needed to revive an extinguished fire. But even by the addition of conventional flameproofing agents, for example antimony trioxide, it has not been possible heretofore to produce polyvinyl chloride, more particularly antistatic, carbon-black-containing polyvinyl chloride, that would be free from after-glow effects.

The challenge has thus been to produce, for the widespread applications characteristic of polyvinyl chloride, material which in partially burnt form is free from after-glow effects.

The process of the present invention for the production of polyvinyl chloride free from after-glow effects, which may contain carbon black in a proportion of up to about 50 parts by weight per 100 parts by weight polyvinyl chloride, comprises incorporating into the polyvinyl chloride red phosphorus in a proportion of about 0.3 to 10 parts by weight, preferably 0.5 to 5 parts by weight, per 100 parts by weight polyvinyl chloride. A further preferred feature of the present invention comprises using the red phosphorus in the form of particles with a size between about 0.001 and 0.02 mm. in diameter.

It has already been shown that carbon black, especially acetylene black, can be used as a polyvinyl chloride additive to reduce its electrical resistance.

However, it is polyvinyl chloride containing carbon black which can be effectively freed from after-glow effects by treatment in accordance with the present invention. The prior art has also suggested that antimony trioxide should be used as an anti-flame agent, which, however, has been found to be incapable of eliminating the after-glow effects of polyvinyl chloride. It is necessary, therefore, to stabilise polyvinyl chloride with respect to after-glow effects by the addition of red phosphorus.

The process of the present invention is advantageously carried out by blending polyvinyl chloride powder produced, for example, by suspension polymerisation, with pulverised red phosphorus and, if desired, carbon black, the blend being made by extrusion and compression into shaped articles.

After inflammation for a short while, polyvinyl chloride containing carbon black is found to have an after-glow tendency different from that of polyvinyl chloride free from carbon black, as already mentioned above. However, after prolonged inflammation with practically complete destruction of the polyvinyl chloride skeleton, the material free from carbon black is also found to show an after-glow tendency. Needless to say, therefore, the present invention also includes the incorporation of red phosphorus into polyvinyl chloride free from carbon black, even though it has more particular importance for carbon-black-containing polyvinyl chloride, which from the onset contains the carbon black with its after-glow tendency. Polyvinyl chloride free from carbon black shows an after-glow tendency only after the removal of substantial proportions of bound chlorine by prolonged flame action.

In its object, the present process for making polyvinyl chloride free from after-glow effects cannot be compared with the conventional production of self-extinguishing materials, as polyvinyl chloride as a halogen carrier is known already to possess some self-extinguishing properties, nor does it relate to the problems referred to in German Pat. No. 1,173,641, which describes the production of self-extinguishing foam plastics.

The advantages associated with the present process are shown in the table of the following example.

EXAMPLE

The after-glow tendency of ignited test tapes of carbon-black-containing and carbon-black-free polyvinyl chloride was tested in a series comprising 18 tests. Some of the test tapes had been impregnated further with red phosphorus or antimony trioxide. The tapes used in all of the tests were based on polyvinyl chloride powder which had been produced by suspension polymerisation, had been stabilised with 3 parts by weight lead stearate, and had a K-value of 62 and a maximum particle size of 0.16 mm. The polyvinyl chloride powder was extruded at 160° C. into strands 3 mm. in diameter and the strands were compressed, while being heated to 190° C., into sheet material 2 mm. thick, which was cut into tapes 10 mm. wide. Additives, such as acetylene black, red phosphorus or antimony trioxide, had been incorporated into the polyvinyl chloride powder prior to extruding it, by blending the individual components in a sigma-type kneader for 30 minutes. The acetylene black used as a blend component had a bulk density of 50 grams per litre and the red phosphorus together with the antimony trioxide were used in the form of particles with a maximum size of 0.02 mm. To test the glow effect, the individual test tapes were ignited by holding one of their ends in the flame of a Bunsen burner, for about 20 seconds. The tapes removed from the flame were exposed to a stream of about 500 litres/hour of air, issuing through a nozzle with an outlet 8 mm. in diameter.

The following table indicates the composition of the individual test tapes and the glow test results, the figures indicated in the right-hand column having the following meanings:

0—No after-glow effect.

1—After-glow effect upon repeated exposure to flame action.

2—After-glow effect upon exposure to flame action.

The specific resistance of the test tapes used in tests 10 to 18 was less than 100 ohm-cm.

TABLE

| Test No. | Additives in P.V.C. test tape [1] | | | After-glow effect |
|---|---|---|---|---|
| | Carbon black | P (red) | $Sb_2O_3$ | |
| 1 | 0 | 0 | 0 | 1 |
| 2 | 0 | 1 | 0 | 0 |
| 3 | 0 | 3 | 0 | 0 |
| 4 | 0 | 5 | 0 | 2 |
| 5 | 0 | 7 | 0 | 1 |
| 6 | 0 | 0 | 1 | 1 |
| 7 | 0 | 0 | 3 | 1 |
| 8 | 0 | 0 | 5 | 1 |
| 9 | 0 | 0 | 7 | 0 |
| 10 | 20 | 0 | 0 | 0 |
| 11 | 20 | 1 | 0 | 0 |
| 12 | 20 | 3 | 0 | 0 |
| 13 | 20 | 5 | 0 | 0 |
| 14 | 20 | 7 | 0 | 0 |
| 15 | 20 | 0 | 1 | 2 |
| 16 | 20 | 0 | 3 | 2 |
| 17 | 20 | 0 | 5 | 2 |
| 18 | 20 | 0 | 7 | 2 |

[1] All in parts by weight per 100 parts by weight P.V.C.

What is claimed is:

1. In a process for the production of antistatic polyvinyl chloride containing carbon black, the inhibition of after-glowing by the step which comprises incorporating red phosphorous in the antistatic polyvinyl chloride, said antistatic polyvinyl chloride containing carbon black to reduce electrostatic charging in a proportion of up to 50 parts by weight carbon black per 100 parts by weight polyvinyl chloride and being prone to after-glow, said red phosphorous being incorporated in said carbon-black-containing polyvinyl chloride in a proportion between about 0.3 and 10 parts by weight polyvinyl chloride whereby the after-glow propensity of said antistatic, carbon-black-containing polyvinyl chloride is reduced.

2. The process of claim 1, wherein the red phosphorus is used in a proportion of 0.5 to 5 parts by weight per 100 parts by weight polyvinyl chloride.

3. The process of claim 1, wherein the red phosphorus is used in the form of particles with a size of about 0.001 to 0.02 mm.

4. The process of claim 1 wherein acetylene black is added to the polyvinyl chloride.

5. The process of claim 1, wherein polyvinyl chloride powder produced by suspension polymerization is blended with pulverized red phosphorus, which is used in combination with carbon black.

References Cited

UNITED STATES PATENTS

| 3,027,349 | 3/1962 | Bahr et al. | 260—45.7P |
| 3,061,583 | 10/1962 | Huhn et al. | 260—45.7P |
| 3,373,135 | 3/1968 | Jenker et al. | 260—45.7P |

MORRIS LIEBMAN, Primary Examiner

T. MORRIS, Assistant Examiner

U.S. Cl. X.R.

260—45.7